United States Patent [19]

Komuro et al.

[11] 4,421,732

[45] Dec. 20, 1983

[54] PROCESS FOR DRY DESULFURIZATION OF FLUE GAS

[75] Inventors: Takeo Komuro; Kenichi Gomi; Norio Arashi, all of Hitachi; Hidetoshi Akimoto, Ibaraki; Yukio Hishinuma, Hitachi; Hajime Iinuma, Katsuta; Osamu Kanda, Kure, all of Japan

[73] Assignee: Hitachi, Ltd., Tokyo, Japan

[21] Appl. No.: 274,277

[22] Filed: Jun. 16, 1981

[30] Foreign Application Priority Data

Jun. 16, 1980 [JP] Japan ............................... 55-80186

[51] Int. Cl.³ .................... B01J 8/00; C01B 17/00; C01B 17/02
[52] U.S. Cl. ................................. 423/569; 423/244; 502/418
[58] Field of Search .......... 423/244 A, 244 R, 242 A, 423/242 R, 574 G, 569, 570; 252/421

[56] References Cited

U.S. PATENT DOCUMENTS

| | | | |
|---|---|---|---|
| 3,502,427 | 3/1970 | Jobswich | 423/244 |
| 4,164,555 | 8/1979 | Steiner | 423/244 |
| 4,219,537 | 8/1980 | Steiner | 423/244 |
| 4,259,304 | 3/1981 | Steiner | 423/244 |

FOREIGN PATENT DOCUMENTS 1267688  5/1968  Fed. Rep. of Germany ...... 423/244

*Primary Examiner*—Gregory A. Heller
*Attorney, Agent, or Firm*—Antonelli, Terry & Wands

[57] ABSTRACT

Sulfur oxides contained in the flue gas from coal-fired boiler are adsorbed by an adsorbent prepared by dry-distilling a portion of fuel coal satisfying at least one of requirements of an ash content lower than 15% by weight and a fixed carbon content of at least 50% by weight, thereby producing semi-coke, and activating the semi-coke by steam, and then the sulfur oxides-adsorbed adsorbent is heated to desorb the adsorbed sulfur oxides at a high concentration. The desorbed sulfur oxides are passed through a bed of semi-coke before the activation to recover the sulfur oxides as elemental sulfur.

9 Claims, 5 Drawing Figures

PROCESS FOR DRY DESULFURIZATION OF FLUE GAS

BACKGROUND OF THE INVENTION

This invention relates to a process for dry desulfurization of flue gas, and more particularly to a process for dry desulfurization of flue gas suitable for purification of combustion flue gas from boilers, furnaces, etc. using coal as fuel.

The process for desulfurization of flue gas to recover elemental sulfur therefrom is to remove the sulfur oxides from flue gas by an adsorbent through adsorption, desorb the adsorbed oxides from the adsorbent after the adsorption, and reduce the desorbed oxides.

As the adsorbent the use of semi-coke prepared by dry distillation of coal is proposed in the U.S. patent application Ser. No. 131,893 now abandoned.

However, all kinds of coal can be not always converted to semi-coke suitable for the adsorbent having a preferable adsorption performance Zy dry distillation.

In the case that coal not suitable for the production of the adsorbent is used as coal for a raw material for adsorbent, the volume of the adsorption column is to be increased since large amount of adsorbent is needed to increase yields of adsorbent, which results in the increase of the running cost in the desulfurization process.

SUMMARY OF THE INVENTION

An object of the present invention is to provide a process for dry desulfurization for increasing yields of the adsorbent.

Another object of the present invention is to provide a process for dry desulfurization for reducing the volume of the adsorption column.

Other object of the present invention is to provide a process for dry desulfurization for reducing the running cost in the process.

According to the present invention, it has been found as the result of examinations made on various kinds of coals that a coal having an ash content as low as possible and a high fixed carbon content is suitable as the starting coal for producing of the adsorbent. From the viewpoint of the sulfur oxide-removing effect, that is, the sulfur oxide-adsorbing capacity, coals having at least one of an ash content lower than 15% by weight and a fixed carbon content of at least 50% by weight can be used.

According to the present invention the sulfur oxide-removing effect is greatly influenced by the ash content and fixed carbon content in coals and when a coal having specific ash and fixed carbon contents is used as the starting coal for production of the adsorbent, a high sulfur oxide-removing effect can be obtained and the running cost of the desulfurization process can be reduced.

From the results of examinations made by the inventors, it has been found that Yallourn coal, Victoria coal, Blackcoal coal, Moura coal, Drayton coal, Invincible coal, Lithgrow coal, Wanbocoal, Optimum Coal, Ermelo coal, Kleincopy coal, Miller coal, Warkworth coal, Blair Athol Coal, Daido Coal, Taiheiyo coal, Haronai coal, Remington coal, Berga coal, Rheinland coal, Awaba coal, Witbank coal, Collie coal, Miike coal, Ashibetsu coal and Blackwater coal are suitable as coals for production of the adsorbent.

DETAILED DESCRIPTION OF THE PREFERRED EMBODIMENT

Figure 1:
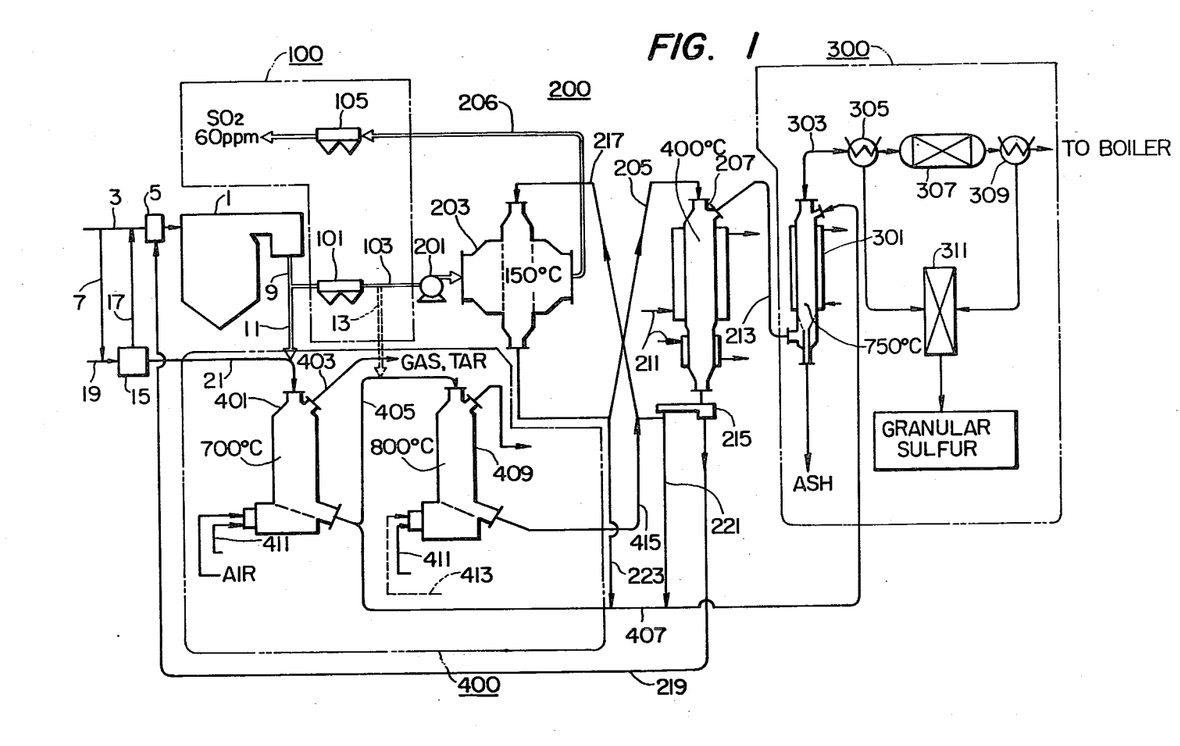
FIG. 1 is a total flow diagram of a desulfurization plant designed for carrying out the present process for dry desulfurization of flue gas.

In FIG. 1, a total flow diagram of a desulfurization plant suitable for carrying out the present process for dry desulfurization of flue gas is given. Steps to be carried out in the desulfurization plant can be divided mainly into dust removal step 100, flue gas treatment step 200, sulfur recovery step 300, and adsorbent (desulfurizer) perparation step 400.

Coal to coal boiler 1 is supplied through coal conduit 3 and pulverized by pulverizer 5, and the pulverized coal is supplied to coal boiler 1. The combustion gas generated in coal boiler 1 passes through flue gas conduit 9 to electrostatic dust precipitator 101, where the dusts contained in the flue gas are removed, and then passes through conduit 103 to adsorption column 203 after pressure increase by blower 201. An adsorbent prepared in adsorption (desulfurizer) preparation step 400 is filled in a bed in adsorption column 203, e.g., a moving bed type desulfurization column, where the adsorbent moves from the top of the column downwards, and the flue gas is freed from sulfur oxides contained therein by passage through the bed of adsorbent, and passes through conduit 206 and bag filter 105 for removing dusts from the flue gas, and the resulting purified flue gas is vented to atmosphere from a stack. The adsorbent that has adsorbed the sulfur oxides and has reached a saturation in adsorption column 203 is withdrawn through adsorbent transfer conduit 205 and led to desorption column 207. A gas generated in a hot gas generator (not shown in the drawing) is supplied to desorption column 207 through inert gas recycle conduit 211, and the temperature within desorption column 207 is kept at 300°–400° C. As a result, the sulfur oxides-adsorbed adsorbent releases sulfur oxides at a high concentration by desorption, and the sulfur oxides are withdrawn through conduit 213. The adsorbent freed from the sulfur oxides by desorption recovers its adsorbing capacity and is led to classifier 215 where abraded adsorbent is removed, and then returned to adsorption column 203 through adsorbent transfer conduit 217. The abraded adsorbent removed by classifier 215 is sent to boiler 1 through conduit 219, and combusted together with other fuel coal.

On the other hand, the sulfur oxides at a high concentration withdrawn through highly concentrated $SO_2$ transfer conduit 213 is led to reduction column 301, where semi-coke prepared in adsorbent (desulfurizer) preparation step 400 is filled and reduction column 301 is heated by combustion of a portion of the semi-coke, thereby heating the inside of the reduction column to 600°–800° C. As a result, the sulfur oxides at a high concentration is converted to vapor of elemental sulfur by reducing action of semi-coke. However, a portion of the sulfur oxides remains unreacted at that stages, and other portion thereof reacts with steam brought therein together with the sulfur oxides at a high concentration to form hydrogen sulfide. Compositions of the gas are 29% $SO_2$, 14% $CO_2$, and 57% $H_2O$ at the outlet of desorption column 207 and 7.6% $H_2S$, 1.3% $SO_2$, 8.2% $S_8$, 40.2% $H_2O$ and 1.9% $H_2$ at the outlet of reduction column 301, though dependent upon the kind of coal and operating conditions.

The effluent gas from the reduction column 301 is led to sulfur condenser 305 through sulfur vapor transfer conduit 303, where elemental sulfur is recovered in a liquid sulfur state, whereas the remaining gas is led to a Claus reactor 307, where elemental sulfur is obtained according to the well known Claus reaction. The elemental sulfur is recovered in a liquid sulfur state in sulfur condenser 309, and is led to granulation column 311 together with the liquid sulfur recovered in sulfur condenser 305.

On the other hand, coal suitable for the production of the absorbent is led to classifier 15 through coal supply conduit 19 for classification. A portion of coal to coal boiler 1 may be led to classifier 15 through another coal supply conduit 7 for classification. Coal having particle sizes of about 5 to about 20 mm is classified at the classifier 15 and led to dry distillation over 401 through coal supply conduit 21 for dry distillation. The remains of coal is led to pulverizer 5 through coal supply conduit 17 for pulverization and pulverized by pulverizer 5, and the pulverized coal is supplied to coal boiler as fuel coal.

Prior to dry distillation coal having particle sizes of about 5 to about 10 mm is contacted through fuel gas conduit 11 with an oxidizing gas, e.g., a portion of coal combustion gas generated in coal boiler 1, whereby the surface of coal is oxidized and the number of adsorption-active pores on the surface of coal is increased. After dry distillation coal may be contacted through flue gas conduit 13 described with dotted lines with an oxidixing gas, e.g., a portion of coal combustion gas, where the adsorbent is oxidized prior to activation.

Dry distillation oven 401 is heated to about 600°– about 700° C., where the coal is converted to dry distillation gas, tar and semi-coke, and the gas and tar are withdrawn through conduit 403 and the semi-coke through conduit 405. A portion of the semi-coke is led to reduction column 301 through conduit 407, but most of the semi-coke is led to activation oven 409 through conduit 405. A portion of the adsorbent that has adsorbed the sulfur oxides may be led to reduction column 301 as reducing agent. A portion of the adsorbent freed from the sulfur oxides by desorption may be led to reduction column 301 through conduit 221 after classification.

Steam and air are supplied to the activation oven 409 through conduit 411 and conduit 413, respectively, and the semi-coke is made to react with steam therein, where oxidation of the semi-coke proceeds to form adsorption-active pores on the semi-coke. The activation reaction is carried out at about 700°–about 900° C. The activated semi-coke has an excellent performance as a $SO_2$ adsorbent. Thus, the semi-coke is withdrawn from activation oven 409 through conduit 415 in an amount corresponding to that of the abraded adsorbent removed by classifier 215, and supplied to conduit 217, whereby the total amount of the adsorbent is maintained constant in adsorption column 203.

Heavy tarry matters are separated from the gas and tar generated in dry distillation oven 401 and withdrawn through conduit 403 and supplied to boiler 1 as fuel (not shown in the drawing). The gas is rich in hydrogen and methane, and thus can be subjected to combustion and heat recovery in the same manner as the tarry matters, but, if necessary, can be converted to a gas richer in hydrogen by the well known reformer, and can be used as a reducing agent in reduction column (not shown in the drawing).

In activation oven 409, a portion of the carbon in the semi-coke is gasified by steam and oxygen, generating a gas rich in hydrogen, carbon monoxide and carbon dioxide. Thus, the generated gas is returned to boiler 1 or combusted in a combuster in another system in the same manner as the dry distillation gas to carry out combustion and heat recovery.

The characteristics of coal suitable for preparation of the adsorbent used in the process according to the invention will be described hereinafter.

Figure 2:
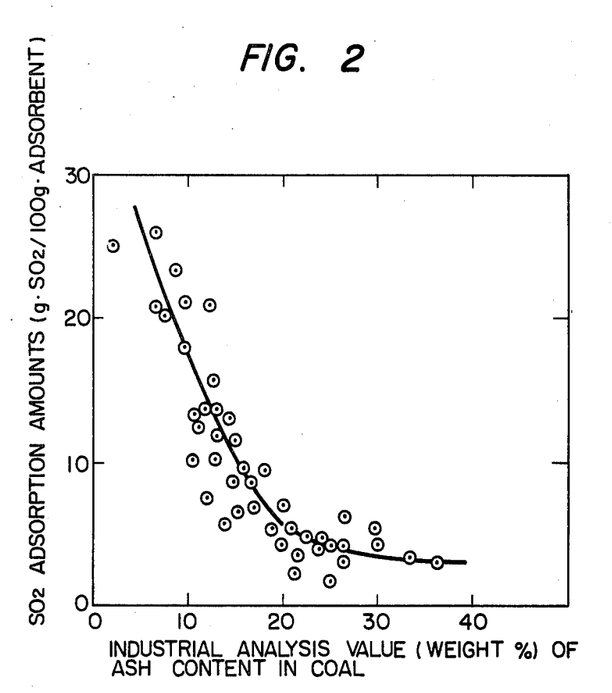
FIG. 2 is a characteristic diagram showing relations between ash content in coal and $SO_2$ adsorption quantity.

FIG. 2 shows $SO_2$ adsorption amounts of the adsorption prepared from various coals.

More specifically, sample coal as described above was pulverized and particles having a size of 1 to 2.38 mm were collected by classification and subjected to dry distillation. The dry distillation was carried out by bringing the coal into contact with a gas comprising 7% of oxygen and 93% of nitrogen at 350° C. for about 10 minutes, elevating the temperature to 850° C. in an atmosphere consisting solely of nitrogen, maintaining the temperature at 850° C. for 1 hour and then effecting cooling to obtain dry distillation coal. Then, the dry distillation coal was activated with steam by using a fluidizing gas comprising 10% of steam and 90% of nitrogen at 850° to 870° C. for a residence time of about 40 minutes. The yield of the adsorbent (based on the dry distillation coal) obtained through the activating step differed according to the kinds of starting coals even if the activation conditions were the same. The sulfur oxide-adsorbing capacity of the adsorbent through the activating step was evaluated according to the following method. Namely, the adsorbent was exposed to an artificial combustion exhaust gas comprising 2% of $SO_2$, 6% of $O_2$ and 10% of $H_2O$ with the balance being $N_2$ for 3 hours while maintaining the adsorption temperature at 100° C., and the sulfur oxide-adsorbing capacity was determined.

Even if the same starting coal was used, the sulfur oxide-adsorbing capacity was changed according to the degree of activation at the step of activating the dry distillation coal. In most of coals, a substantially linear relation was obtained between the yield of the adsorption (based on the dry distillation coal) and the sulfur oxide-adsorbing capacity. Accordingly, the gradient of sulfur oxide adsorption quantity/adsorbent yield was obtained from the sulfur oxide-adsorbing capacity of the dry distillation coal obtained by dry distillation of coal and the relation between the sulfur oxide-adsorbing capacity of the adsorbent obtained by activation of the dry distillation coal and the yield of the adsorbent (based on the dry distillation coal), and with respect to various coals, the sulfur oxide adsorption quantity was obtained at an adsorption yield of 70%. In short, the sulfur oxide-adsorbing capacities of adsorbent derived from various coals were compared with one another by using values determined at an adsorbent yield of 70%.

From the results of this comparison shown in FIG. 2, it is seen that the higher is the ash content in the coal, the smaller is the $SO_2$ adsorption quantity and that the higher is the fixed carbon content, the larger is the $SO_2$ adsorption quantity. The critical adsorbing capacity for the adsorbent that can be used in a moving layer adsorption column of the process for dry desulfurization of flue gas varies according to the sulfur oxide concentration in a coal combustion exhaust gas, the quantity of a gas to be treated, the installation area of the desulfurizing apparatus, the capacity of a blower for elevating the pressure of the combustion exhaust gas and the degree of degradation of the capacity of the adsorbent under repetition of adsorption and desorption. According to study on these factors it was found that if the $SO_2$ adsorption quantity is at least 10 g $SO_2$/100 g of the adsorbent when an artificial fuel combustion gas comprising 2% of $SO_2$, 10% of $H_2O$ and 6% of $O_2$ with the balance being $N_2$ is adsorbed at 100° C. for 3 hours according to the above-mentioned evaluation method, a desulfurizing ratio of at least 90% can be obtained in the case where the $SO_2$ concentration in a combustion exhaust gas to be treated is 1000 ppm (on the dry base).

Figure 3:
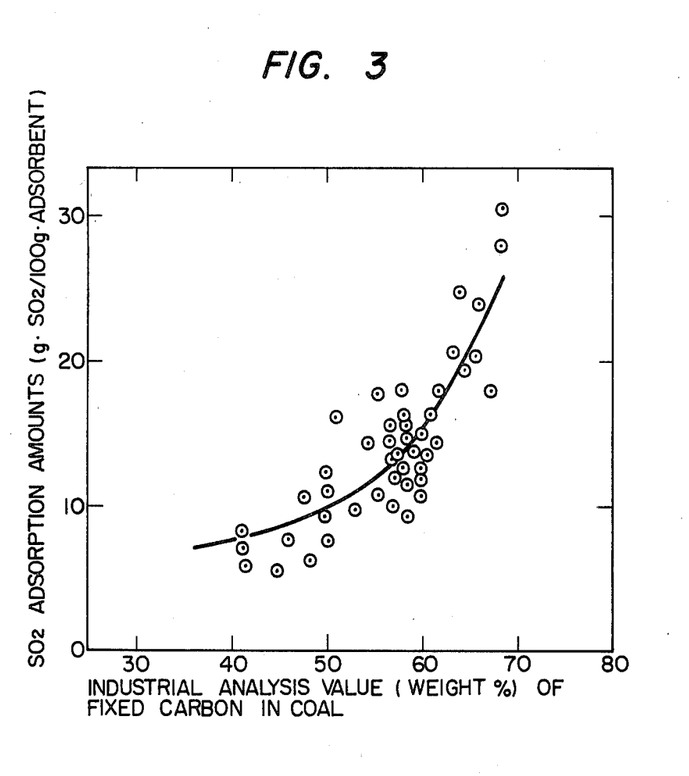
FIG. 3 is a characteristic diagram showing relations between fixed carbon content in coal and $SO_2$ adsorption content.

As is seen from FIG. 3 showing relations between the fixed carbon content in coal and the $SO_2$ adsorption quantity, in order to obtain a desulfurizing ratio of at least 90% in the treatment of the above-mentioned combustion exhaust gas having an $SO_2$ concentration of 1000 ppm, it is necessary that the fixed carbon content in coal should be at least 50% by weight. Among coals examined by us, Blackwater coal has a highest fixed carbon content of 66.9% by weight. From the tendency seen in FIG. 3, it is construed that if a coal having a fixed carbon content higher than 70% is used as the starting coal, an adsorbent having a higher $SO_2$ adsorbing capacity as determined according to the above evaluation method will be obtained.

Figure 4:
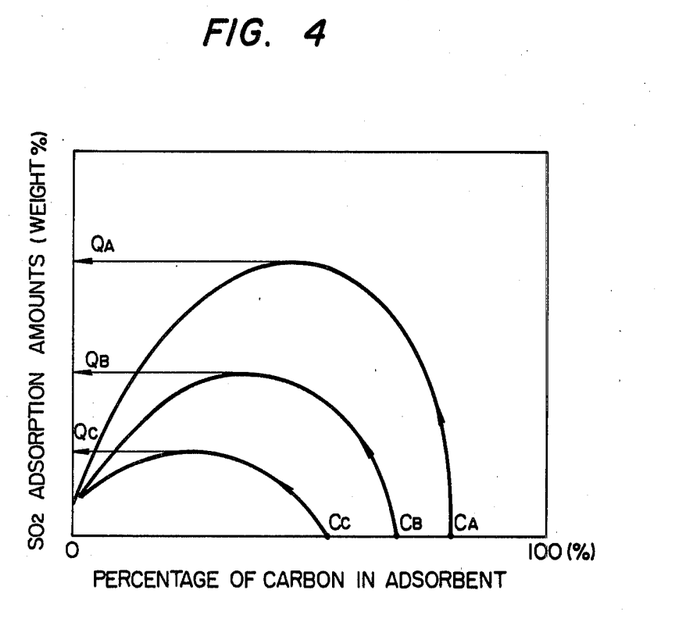
FIG. 4 is a characteristic diagram showing relations between carbon content in the adsorbent and the $SO_2$ adsorption amount.

As is seen from the results shown in FIGS. 2 and 3, the ash content and fixed carbon content are important factors in selecting a starting coal for formation of an adsorbent. This point will now be described in detail with reference to FIG. 4. When coal is subjected to dry distillation, carbonization is advanced to such an extent that the volatile component content is reduced to about 1 to about 3%. Accordingly, the ash content is apparently concentrated in the dry distillation coal. If the ash content is lower in order of coals A, B and C, as shown in FIG. 4, the ash and fixed carbon contents are Ca, Cb and Cc. When these dry distillation coals are subjected to steam activation, carbon reacts with steam and carbon in the adsorbent is reduced, and with decrease of the carbon content, the $SO_2$ adsorption quantity is increased and arrives at a maximum value when the carbon content in the adsorbent is a certain value. Then, the $SO_2$ adsorption quantity is decreased with decrease of the carbon content. As is apparent from FIG. 4, even if a coal having an ash content corresponding to that of coal C is activated under any activation conditions, a level of the $SO_2$ adsorption quantity attainable by coal A or B cannot be attained at all.

Coals applicable to formation of the adsorbent have been clarified by the foregoing description. More specifically, a coal having an ash content as low as possible and a high fixed carbon content is preferred as the starting coal for production of the adsorbent. Furthermore, coals satisfying both the requirements of the ash content and fixed carbon content can preferably be used, and also a mixture of two or more of applicable coals can be used.

In the foregoing embodiment, Erumello coal is used as the starting coal for production of the adsorbent. It will readily be understood that if other coal having the above-mentioned ash content and fixed carbon content is used for production of the adsorbent, desulfurization of a combustion gas can similarly be accomplished by using the resulting adsorbent. It is preferred that a coal having a low ash content and a high fixed carbon content be used as the starting coal for production of the adsorbent. In this case, the amount of the adsorbent constantly supplied through the conduit 415 in FIG. 1 can be reduced, and the volume of the moving layer adsorption column 203 can therefore be reduced and the speed of the adsorbent moving in the moving layer adsorption column 203 can be decreased.

In the foregoing description, the starting coal for production of the adsorbent is directly delivered in the site where a boiler 1 is located and the adsorbent is prepared in the same site. Of course, the adsorbent prepared from a starting coal as described above in a different site can be used for the moving layer adsorption column 203 and the intended effects of the present invention can similarly be attained.

Furthermore, a coal other than those mentioned above can be used for the production of the adsorbent if the coal has ash and fixed contents within the ranges specified in the present invention, and it is expected that a sulfur oxide-removing effect comparable to that mentioned above will be attained if the resulting adsorbent is used.

In order to simplify the process for the preparation of the adsorbent, pulverized coal is used as the starting coal, but in the present invention, attainment of a comparable sulfur oxide-removing effect can be expected even when granulated coal is used as the starting coal.

Another characteristics of coal suitable for preparation of the adsorbent used in the process above will be described hereinafter.

The process for the preparation of adsorbent according to another embodiment of the present invention is characterized by selecting a starting coal in which a coal is pulverized to a predetermined particle size and mixed with water, the pH value of the aqueous solution is measured and if the coal is strongly acidic, the coal is used as the starting coal.

The pH value is measured on an aqueous solution formed by mixing 1 part of coal with 4 parts of water, and it is preferred that the pH value be lower than 4.5. If a coal satisfying this requirement is subjected to dry distillation and activation, a desulfurizing agent having a high adsorbing capacity can be obtained.

Another embodiment of the present invention will now be described with reference to the following Example of the process of selecting coals for production of adsorbent.

One part of a pulverized coal was mixed and stirred with 4 parts of pure water for about 5 hours, and the mixture was allowed to stand still for about 1 hour and the pH value of the resulting aqueous solution was measured.

The coal was dried at 700° C. for 1 hour in a nitrogen atmosphere and the dry distillation coal was activated at 900° C. with steam. The steam activation was stopped when the yield of the adsorbent was 70% by weight based on the dry distillation coal. The obtained adsorbent was brought in contact with an artificial combustion exhaust gas comprising 2% of $SO_2$, 10% of $H_2O$, 6% of $O_2$ and 82% of $N_2$ at 100° C. for 3 hours. The $SO_2$ adsorption quantity was determined from the accumulated amount of dilute sulfuric acid and the like.

Figure 5:
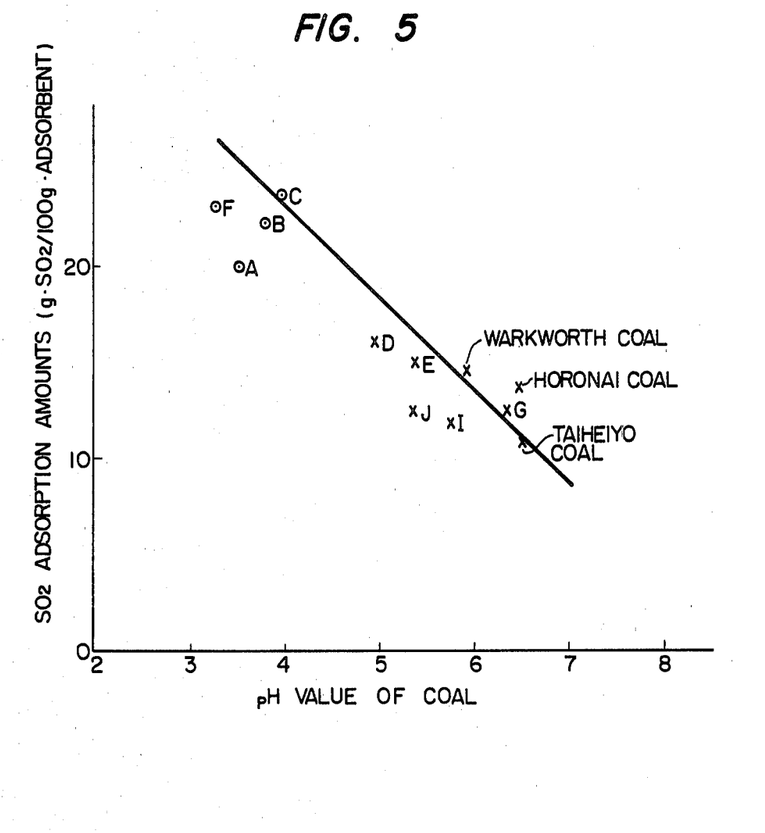
FIG. 5 is a characteristic diagram showing examples of relations between pH value of coal and $SO_2$ adsorption amount.

In FIG. 5, pH values of aqueous solutions of coals as determined according to the above-mentioned and the $SO_2$ adsorption quantities of adsorbent obtained by dry distillation and activation of these coals are plotted.

In FIG. 5, coals A, B, C and F have a pH value lower than 4.5 and are included in the scope of the present invention, and they provide adsorbent having a large $SO_2$ adsorption quantity and it is confirmed that they are suitable as starting coals for production of adsorbent. Coals D, E, J, I and G and Horonai coal and Taiheiyo coal, each having a pH value higher than 5, provide adsorbent having a small $SO_2$ adsorption quantity, and it is confirmed that these coals are not suitable as starting coals for production of adsorbent having a high $SO_2$ adsorbing capacity.

An adsorbent is prepared by subjecting the so selected coal to dry distillation or activation. The intended adsorbent may also be prepared by pulverizing a coal and subjecting the pulverized coal to dry distillation and activation, if the coal satisfies the requirement for selection of the starting coal specified according to another embodiment of the present invention. Moreover, an adsorbent having a similar desulfurizing activity can be obtained when a granulated coal is used.

According to one embodiment of the present invention, since coal providing a high sulfur oxide-removing effect is selected as the starting coal for production of the adsorbent based on the ash content and fixed carbon content by weight, the volume of the moving layer adsorption column can be reduced. Moreover, when a coal satisfying the above selection requirements is used as the fuel coal for a boiler and the adsorbent prepared from this coal is used, a highest effect of reducing the running cost in the process for dry desulfurization can be attained. Still further, when coals specified in the present invention are used, yields of the absorbent can be increased, and occurrence of troubles by tar-like products at the dry distillation and activation steps can remarkably be moderated.

According to another embodiment of the present invention, the adsorbent having a high desulfurizing activity is obtained by using a strongly acidic coal, preferably a coal having a pH value lower than 4.5, as the starting coal for production of the adsorbent, and if this adsorbent is used for an apparatus for dry desulfurization of flue gas, the volumes of an adsorption column and a heating desorption and regeneration column can be reduced and the structure can be rendered compact. Therefore, prominent effects of reducing the cost of accessory equipment of the desulfurization apparatus and also reducing the running cost of the desulfurization process can be attained.

What is claimed is:

1. A process for dry desulfurization of flue gas, wherein sulfur oxides are removed from a flue gas produced by boilers or furnaces using coal as at least a part of the fuel, which comprises:

preparing a semi-coke adsorbent by dry distillation and activation of the fuel coal having particle sizes between about 5 and about 10 mm, said fuel coal sent to said dry distillation having at least one of an ash content lower than 15% by weight and a fixed carbon content of at least 50% by weight, said fuel coal sent to said dry distillation having a pH value smaller than 4.5 at an acidity test carried out under such conditions that (1) the coal is mixed with pure water at a coal/pure water weight ratio of $\frac{1}{4}$ and (2) the mixing and stirring time is about 5 hours and, after the resulting aqueous solution has been allowed to stand still for about 1 hour, the pH value of the aqueous solution is measured;

moving said semi-coke adsorbent, prepared by dry distillation of fuel coal having particle sizes between about 5 and about 10 mm, through a moving bed type desulfurization column from the top of the column downwards;

contacting the flue gas with the semi-coke adsorbent in the column to adsorb the sulfur oxides from the flue gas;

heating the sulfur oxides-adsorbed semi-coke adsorbent after it has moved through the column, thereby desorbing the sulfur oxides at a high concentration while simultaneously regenerating the semi-coke adsorbent;

recyclically using the regenerated semi-coke adsorbent; and passing the desorbed sulfur oxides through a bed of dry distilled semi-coke heated to a high temperature, thereby converting the sulfur oxides to elemental sulfur.

2. A processs according to claim 1, wherein a coal to be supplied to the dry distilling step is oxidized by an oxidizing gas prior to dry distillation.

3. A process according to claim 1, wherein the adsorbent prepared by dry distillation of coal is oxidized by an oxdizing gas prior to activation.

4. A process according to claim 1, wherein further compises passing the desorbed sulfur oxides through a bed of dry distilled semi-coke heated to a high temperature, thereby converting the sulfur oxides to elemental sulfur, and supplying a portion of the sulfur oxides-adsorbed semi-coke adsorbent to the bed as reducing agent.

5. A process according to claim 1, wherein the semi-coke pulverized during the recylic use of semi-coke in adsorption and desorption is passed to the boiler or furnace for combustion.

6. A process according to claim 1,
wherein, prior to preparing the semi-coke adsorbent by dry distillation and activation, the coal is classified into two portions, one of which has particle sizes between about 5 and about 10 mm and is supplied to the following dry distillation, and the other of which has the remains and is supplied to the furnace or boiler as a part of the fuel;
wherein the coal having particle sizes between about 5 and about 10 mm is oxidized by the combustion exhaust gas generated in the boiler or furnace prior to dry distillation;
wherein the sulfur oxides are adsorbed onto said semi-coke adsorbent prepared by the dry distillation of the coal oxidized in the step of oxidizing the coal, thereby removing the sulfur oxides from the flue gas while pulverizing a portion of the semi-coke adsorbent;
wherein the sulfur oxides-adsorbed semi-coke adsorbent is heated to thereby desorb the sulfur oxides at a high concentration and simultaneously regenerate the semi-coke adsorbent while pulverizing a portion of the semi-coke adsorbent, thereby recyclically using the semi-coke in the adsorption; and wherein the desorbed sulfur oxides are passed through a bed of a part of the sulfur oxides-adsorbed semi-coke adsorbent heated to a high temperature, thereby converting the surfur oxides to elemental sulfur.

7. A process according to claim 1, wherein the dry distillation takes place in a dry distillation oven at a temperature of 600°–700° C., whereby the coal is converted to dry distillation gas, tar and semi-coke.

8. A process according to claim 7, wherein after said dry distillation the semi-coke is passed to an activation oven, air and steam are passed to said activation oven, and the semi-coke reacts with the steam at a temperature of about 700°–900° C. to oxidize said semi-coke to form adsorption active pores on said semi-coke and form a generated gas.

9. A process according to claim 8, wherein gas and tar formed in the dry distillation oven and the generated gas formed in the activation oven are passed to the boiler or furnace.

* * * * *